Dec. 6, 1955   L. J. GUNYOU   2,725,701
HARROW JACK

Filed April 25, 1951   2 Sheets-Sheet 1

INVENTOR.
LYMAN JOHN GUNYOU.
BY
Aeden D. Redfield
ATTORNEY.

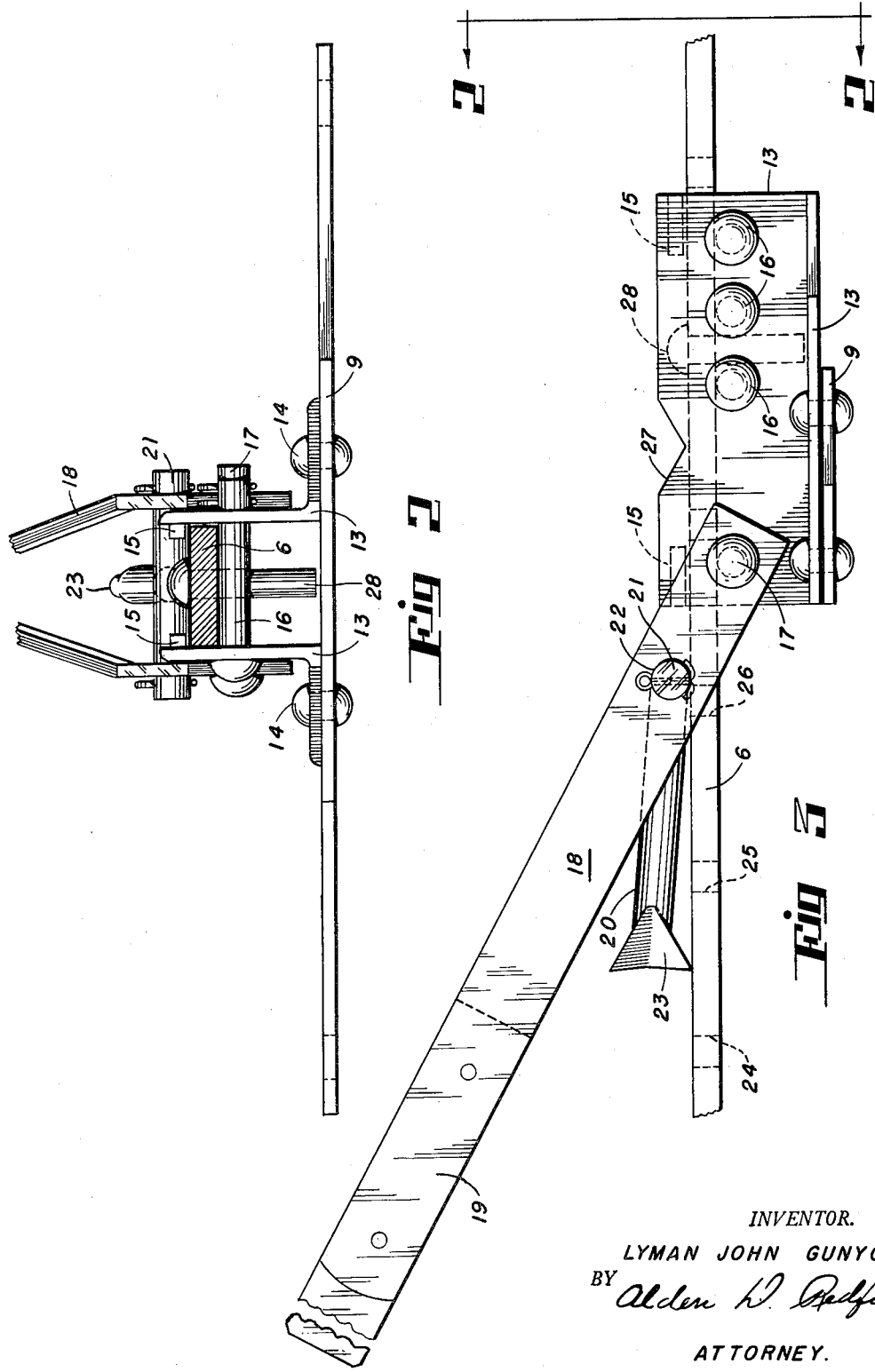

United States Patent Office

2,725,701
Patented Dec. 6, 1955

2,725,701

HARROW JACK

Lyman John Gunyou, Celina, Ohio, assignor to Avco Manufacturing Corporation, Cincinnati, Ohio, a corporation of Delaware Application April 25, 1951, Serial No. 222,870

1 Claim. (Cl. 55—83)

The present invention relates to an accessory for a disc harrow and concerns more particularly a hand operated jack to facilitate adjustment of a pair of harrow gangs.

It is commonplace today to construct disc harrows having front and rear gangs in tandem relationship. Such a four gang disc harrow is usually drawn by a tractor and may be used with the gangs in parallel outspread relationship or with all of the gangs angled so that each harrow gang is disposed at an angle relative to the line of draft of the implement.

For many years trailer type harrows have been built to permit their use with all four gangs angled; however, in most of these harrows, all of the gangs could not be angled simultaneously by operation of one control. Although modern harrows do provide for simultaneous angling of all gangs by operation of a single control, angling of the front and rear gangs independently in pairs, if possible at all, usually requires separate adjustment of the gangs independently of the main control. In fact, independent angling can not be accomplished easily and quickly in most modern harrows, it usually being necessary to remove and re-locate bolts to change the length of the pull bars associated with the various gangs.

In most harrows where the front and rear gangs can be separately adjusted, independent angling of the front gangs is easily accomplished; however, independent angling of the rear gangs is often more difficult to accomplish since the friction inherent in the harrow hinders relative motion of the parts. Furthermore, in some harrows the geometry of the gangs and associated linkage does not favor angling adjustment merely in response to motion along the line of draft and the resulting ground forces against the harrow discs. Supplementary forces must be applied to the rear gangs of such harrows to adjust their angular positions.

The present invention has been designed to overcome this difficulty and has as an important general object the provision of a manually manipulated device for adjusting the relative position of the rear harrow gangs easily and rapidly.

More specifically, an object of the present invention is the provision of a manually operated hand jack attached to the slidable saddle to which the rear gangs are pivotally attached, the hand jack being swingable and engageable with the centrally disposed draft means on which the saddle slides. The hand jack can be forced back and forth to produce relative movement between the saddle and the draft means.

More broadly stated, an object of the present invention is the provision of a manually manipulated device for producing relative motion between two parts of a disc harrow.

Another object of the present invention is to provide a safe, simple, rugged and dependable hand jack to facilitate forward and rearward adjustment of the inner ends of a pair of harrow gangs.

Briefly stated, the present invention comprises a hand lever which is pivotally attached at its lower end to a saddle slidably engaged with a centrally disposed draft bar. The inner ends of the rear harrow gangs to be adjusted are pivotally attached to the saddle. A pawl is pivotally attached to the hand lever and is positioned for engagement with a series of holes formed in the draft bar. By engaging the outstanding end of the pawl with any one of the series of holes and applying force to the hand lever, relative movement may be produced between the saddle and draft bar.

The novel features that are considered characteristic of the invention are set forth in the appended claims; the invention itself, however, both as to its organization and method of operation, together with additional objects and advantages thereof will best be understood from the following description of a specific embodiment when read in conjunction with the accompanying drawings, in which:

Fig. 2 is an end view of the harrow jack to an enlarged scale taken on plane 2—2 of Fig. 3; and Fig. 3 is a side view of the harrow jack taken on plane 3—3 of Fig. 1.

Figure 1:
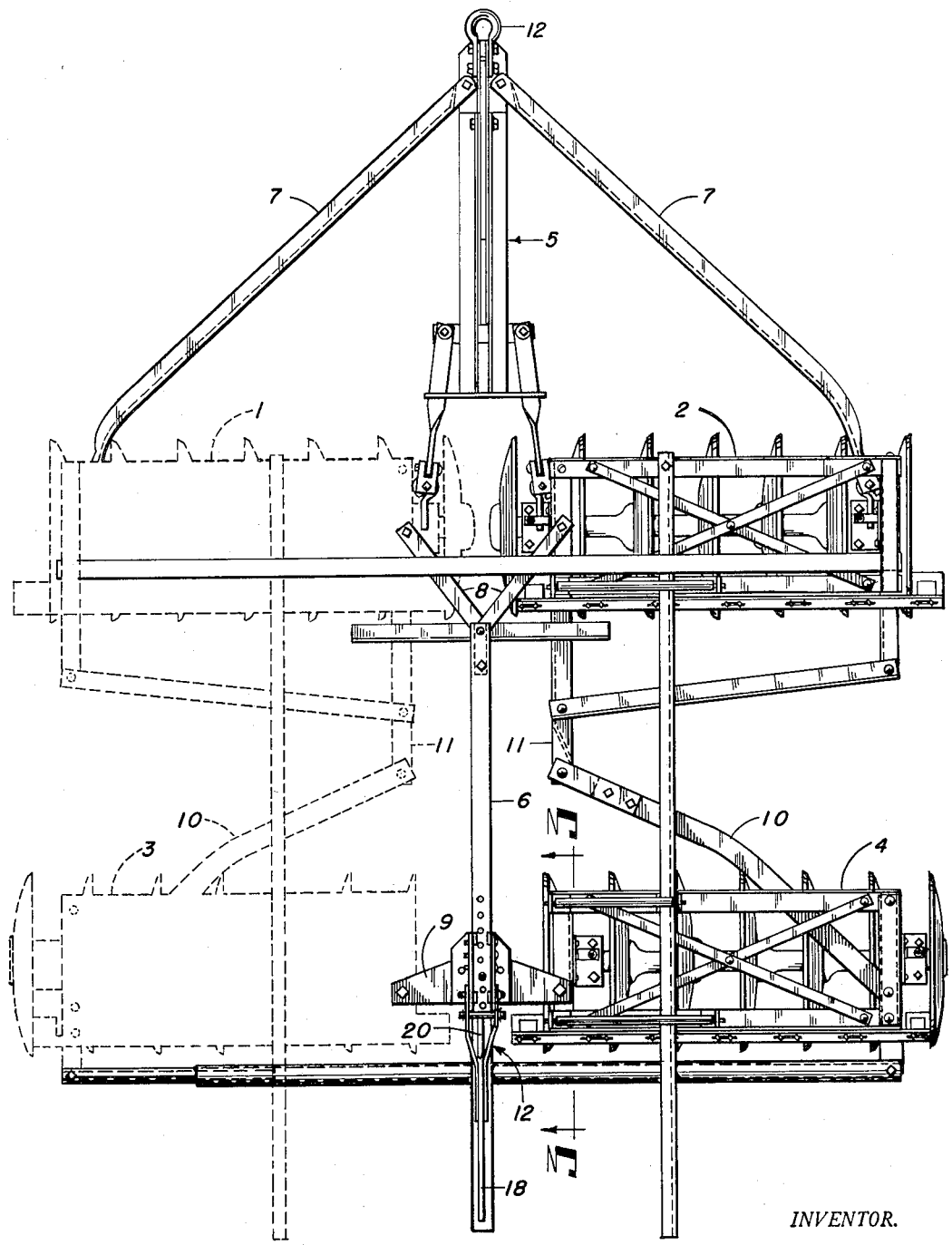
Fig. 1 is a plan view of a four gang disc harrow, one-half of the harrow being shown schematically and the other in full detail to facilitate a description of the invention.

With reference to Fig. 1, the present invention can be used to particular advantage with a four gang disc harrow including outspread front gang assemblies 1 and 2 and rear gang assemblies 3 and 4 in tandem relationship. Forward motion is imparted to the gang assemblies through an extensible draft hitch, generally designated 5, and is transferred to the rear gang assemblies partially through a draft bar 6. A pair of tension members 7 are pivotally attached at their forward ends to the forward end of draft hitch 5 and are pivotally attached at their rear ends to the outer ends of front gangs 1 and 2.

Draft bar 6 is pivotally attached at its forward end to anchor straps 8 which are pivotally attached in turn at their forward ends to the inner ends of gang assemblies 1 and 2. A saddle 9 is slidably engaged with the rear portion of draft bar 6 and extends transversely of the draft bar for pivotal attachment with the inner ends of rear gangs 3 and 4. The outer ends of these gangs are pivotally connected through links 10 to rearwardly extending arms 11 rigidly attached to the inner ends of the front gangs.

The pull of the draft means is transferred from eye 12 through draft hitch 5 and tension members 7 to the inner and outer ends, respectively, of the front gangs. Draft forces are applied to the inner and outer ends of the rear gangs through draft bar 6 and links 10, respectively.

The complete structural arrangement and mode of operation of the harrow is explained in detail in application Serial No. 210,185, filed February 9, 1951, now Patent No. 2,684,563, by Lyman John Gunyou on a Disc Harrow. Sufficient details of this harrow have been explained herein to facilitate an understanding of the present invention, although the harrow per se does not comprise any part of the present invention and is fully claimed in the before-mentioned application.

As will be understood by those skilled in the art, the disc harrow may be used with all four gangs angled simultaneously. The gangs may be moved from the parallel position shown in Fig. 1 to a fully angled position merely by draft forces applied to eye 12 while draft hitch 5 is allowed to extend in length. While the draft hitch lengthens, all four gangs angle simultaneously under the control of the related structural members.

Occasionally, however, it is desirable to use the front pair or the rear pair of gangs angled alone. Although angling of the forward gangs can be easily accomplished merely by proper manipulation of the extensible hitch 5 in combination with the motion of the harrow, independent angling of the rear gangs often is difficult because of friction and the geometric relationship of the rear gangs and associated links. To overcome this difficulty a harrow jack, generally designated 12, has been provided to facilitate shifting of the inner ends of the rear harrow gangs as necessary to attain any angling condition desired.

The details of the harrow jack are shown fully in Figs. 2 and 3. Illustrated in these figures is the saddle 9 which includes a pair of parallel upstanding angle irons 13 riveted to the saddle as at 14. The saddle is freely slidable on draft bar 6 which is disposed between the upstanding portions of the angle irons. To prevent disengagement of the saddle from the draft bar, retaining blocks 15 are welded or otherwise secured to the inner faces of the upright portions of angle irons 13 and a plurality of transverse pins 16, carried by the upright portions of the angle irons, below blocks 15, are positioned to engage the under side of the draft bar.

It has been found that pins 16 act as rollers and help to reduce friction between the saddle and the draft bar, thus facilitating the relative movement.

A hand lever 18 is pivotally attached by pin 17 to the angle irons 13. The hand lever has a bifurcated lower end to facilitate attachment to both of the angle irons and has an upper end formed into handle grip portion 19 which may be grasped by the operator to impart swinging movements to the hand lever about pivot pin 17.

A pawl 20, including a transverse cylindrical portion 21, is pivotally engaged with the lower bifurcated portion of hand lever 18, as at 22. It is to be noted that pivot points 17 and 22 are relatively spaced so that swinging movement, imparted to the hand lever, causes portion 21 of the pawl to move along an arc about pin 17 as a center.

Pawl 20 is formed into an enlarged flat triangular head 23 which is suitably dimensioned for engagement with any one of a series of holes 24 formed in draft bar 6. The pawl is shown in Fig. 3 disengaged from the holes in the draft bar. By rotating hand lever 18 clockwise, head 23 of the pawl is brought into engagement with one of the holes, such as 25, formed in the draft bar. After such engagement, hand lever 19 is rotated counterclockwise which creates a toggle action with pivot pin 17 and cylindrical portion 21 and produces relative motion between the saddle 9 and the draft bar 6.

The swinging movement of the hand lever is limited by the engagement of portion 21 with the upper face of draft bar 6. When this limit of motion has been attained, direction of movement of the hand lever must be reversed, thereby disengaging the head of the pawl from the hole in the draft bar and bringing it into engagement with the next successive hole, such as at 26. As the foregoing operation is repeated, saddle 9 is gradually moved towards the right in Fig. 3 relative to the draft bar 6.

Should it be desirable to shift the saddle to the left relative to the draft bar, it is merely necessary to swing pawl 20 upwardly through the bifurcated hand lever until it is disposed at the right of the hand lever, rather than at the left as illustrated in Fig. 3. Operation of the hand jack while the pawl is on the right hand side is substantially the same as described previously. The head of the pawl, being triangular, is readily engaged with the holes formed in the draft bar regardless of the disposition of the pawl relative to the hand lever.

It is to be noted that a pair of notches 27 may be formed in the upper portion of angle irons 13 to provide clearance for cylindrical portion 21, thus permitting more movement of the hand lever before portion 21 prevents further travel.

A particularly desirable feature of the present invention is that cylindrical portion 21 prevents handle grip portion 19 from coming too close to draft bar 6. Thus injury to the operator by having his hand pinched between portion 19 and the draft bar is precluded.

Furthermore, since the hand lever can never rest against the draft bar, it is always held in relatively elevated position in which it is easy to grasp and bring into motion.

From the foregoing description it will be appreciated that the hand jack may be used to shift the saddle forwardly or rearwardly relative to the draft bar 6. Thus, if all of the harrow gangs are already angled, the rear gangs can be readily brought back to the parallel position by manipulation of the hand jack. Furthermore, when all of the harrow gangs are in parallel position, the rear gangs may be angled independently by use of the hand jack while the forward gangs remain in parallel.

After the rear gangs have been adjusted, a pin 28 may be dropped through one of the holes of the draft bar aligned with the space between any two of the transverse pins 16, thus effectively locking the saddle to the draft bar. Since a plurality of holes is provided in the draft bar as well as three transverse pins 16, a large number of positions are available in which the saddle may be secured.

Although the draft bar has been shown perforated by a series of holes 24, 25 and 26, it should be appreciated that obvious equivalents for these holes are within the purview of the present invention; thus, if bosses were provided on the draft bar or if ratchet teeth were formed in its upper surface, these elements, being obvious equivalents for holes 24, 25 and 26, would fall within the scope of the appended claim.

Having described a preferred embodiment of my invention, I claim:

A harrow jack for use with a disc harrow of the type having outspread forward and following disc gang pairs pivotally connected so that relative angular movement of the inner ends of said forward and following gang pairs effects varying ground cutting positioning of said disc gang pairs, said harrow jack comprising a centrally disposed draft bar for connecting said forward and following harrow gang pairs, with an end of said bar pivotally secured to the inner ends of one of said gang pairs, a saddle slidably disposed on said bar and secured to the inner ends of the other of said gang pairs, said bar being formed to define a plurality of longitudinally spaced openings, a hand lever having a bifurcated lower end pivotally attached to said saddle under said bar to permit swinging movements of said hand lever in the direction of the length of the bar, a pawl pivotally attached between the bifurcated portion of said hand lever for swinging movements between said bifurcated portion to opposite sides of said lever, the point of pivotal attachment of said pawl being above the pivot of said hand lever and above said bar so that the outstanding end of said pawl when positioned on one side of said lever is engageable with the openings formed in said bar whereby swinging movement in one direction imparted to said hand lever produces relative motion of said bar relative to said saddle in the same direction as the movement of said lever, said pawl being selectively swingable as aforesaid to the opposite side of said lever and also engageable with other of said openings in such position whereby opposite relative motion between saddle and bar is effected by the said opposite swing of said lever, and separate means for releasably and selectively securing said saddle and bar in desired relative positions effected by said hand lever thereby to position said gang pairs in desired variations of ground cutting angularity.

References Cited in the file of this patent
UNITED STATES PATENTS

| | | |
|---|---|---|
| 487,322 | Drader et al. | Dec. 6, 1892 |
| 884,776 | Tanner | Apr. 14, 1908 |
| 1,344,159 | Warne | June 22, 1920 |
| 1,497,721 | Heston | June 17, 1924 |
| 2,043,141 | Wilmesherr | June 2, 1936 |